(12) United States Patent
Yang et al.

(10) Patent No.: US 8,112,055 B2
(45) Date of Patent: Feb. 7, 2012

(54) CALIBRATING RECEIVE CHAIN TO REDUCE SECOND ORDER INTERMODULATION DISTORTION

(75) Inventors: Xuebin Yang, Beijing (CN); Xu Zhang, Beijing (CN); Jingyi Ma, Beijing (CN); Stewart S. Taylor, Beaverton, OR (US); Brent R. Carlton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 857 days.

(21) Appl. No.: 12/147,365

(22) Filed: Jun. 26, 2008

(65) Prior Publication Data

US 2009/0325529 A1 Dec. 31, 2009

(51) Int. Cl.
*H04B 1/12* (2006.01)
(52) U.S. Cl. ........................................ 455/296; 455/323
(58) Field of Classification Search .................. 455/296, 455/313, 323, 324, 333, 334
See application file for complete search history.

(56) References Cited

U.S. PATENT DOCUMENTS

| | | | |
|---|---|---|---|
| 6,343,211 B1 * | 1/2002 | Thodesen et al. | 455/317 |
| 6,871,057 B2 * | 3/2005 | Ugajin et al. | 455/323 |
| 7,177,616 B2 * | 2/2007 | Connell et al. | 455/296 |
| 7,421,263 B2 * | 9/2008 | Kim | 455/234.1 |
| 7,554,380 B2 * | 6/2009 | Embabi et al. | 327/356 |
| 7,561,862 B2 * | 7/2009 | Woo-nyun | 455/226.1 |
| 7,774,019 B2 * | 8/2010 | Sivonen et al. | 455/552.1 |
| 7,929,938 B2 * | 4/2011 | Sellars et al. | 455/333 |
| 8,010,074 B2 * | 8/2011 | Kaczman et al. | 455/313 |
| 2006/0094386 A1 * | 5/2006 | Darabi et al. | 455/296 |
| 2008/0039045 A1 * | 2/2008 | Filipovic et al. | 455/295 |
| 2009/0075622 A1 * | 3/2009 | Zhuo et al. | 455/333 |

FOREIGN PATENT DOCUMENTS

WO W004/001992 A1 12/2003

OTHER PUBLICATIONS

Dufrene, Krzysztof et al., "Adaptive IP2 Calibration Scheme for Direct-Conversion Receivers", IEEE TU4C-3, 2006, pp. 111-114, Erlangen, Germany.
Xu, Qiming et al., "A Direct-Conversion Mixer With DC-offset Cancellation for IEEE 802.11a WLAN Receiver," ISCAS 2006, pp. 5696-5699.
Bagheri, Rahim et al., "Software-Defined Radio Receiver: Dream to Reality," IEEE Communications Magazine, Aug. 2006, pp. 111-118.
Manstretta, Danilo et al., "Second-Order Intermodulation Mechanisms in CMOS Downconverters," IEEE Journal of Solid-State Circuits, Mar. 2003, pp. 394-406, vol. 38, No. 3.
Dufrene, Krzysztof, et al., "A 0.13um 1.5V CMOS I/Q Downconverter with Digital Adaptive IIP2 Calibration," IEEE International Solid-State Circuits Conference, 2007, pp. 86, 87 and 589.

* cited by examiner

*Primary Examiner* — Blane J Jackson
(74) *Attorney, Agent, or Firm* — Schwabe, Williamson & Wyatt, P.C.

(57) ABSTRACT

Embodiments of apparatuses, articles, methods, and systems for calibrating receive chain to reduce second order intermodulation distortion are disclosed herein. In some embodiments, a reference sensing chain is used to generate reference second-order intermodulation distortion signals that may be used to adjust a calibration code. In some embodiments, a calibration code may be adjusted using one or more feedback loops of a baseband amplifier. The embodiments may be employed, e.g., to manage power in wireless networks. Other embodiments and usages may be described and claimed.

18 Claims, 8 Drawing Sheets

CALIBRATING RECEIVE CHAIN TO REDUCE SECOND ORDER INTERMODULATION DISTORTION

FIELD

Embodiments of the present disclosure relate generally to the field of radio frequency (RF) receivers, and more particularly to, calibrating receive chain to reduce second order intermodulation distortion (IMD2).

BACKGROUND

A direct conversion RF receiver (DCR) may be used to demodulate an incoming signal by mixing it with a local oscillator (LO) synchronized in frequency to a carrier wave of a wanted signal. A DCR may also be referred to as a zero intermediate frequency (IF) receiver.

DCR architectures have been widely adopted due to their high integration levels, low costs on complementary metal oxide semiconductor (CMOS) processes, and flexibility in implementing multi-standard receivers. One of the fundamental difficulties with a DCR is that IMD2 may cause signal quality degradation under strong blocker conditions.

High second order linearity may be desired to avoid signal to noise plus distortion ratio (SNDR) degradation by IMD2. For example, a second order intercept point (IP2) of 65 decibels referenced to milliwatt (dBm) or greater may be desired to detect a −82 dBm 54 megabit per second (Mb/s) signal (e.g., a 802.11g signal) in the presence of wireless code division multiple access (WCDMA) blocker. A good RF/analog design alone may not guarantee such a high IP2. This is due to the fact that IP2 depends on not only RF/analog design but also blocker frequency, local oscillator (LO) frequency, power supply voltage, ambient temperature variation, etc. IP2 may ultimately be limited by matching requirements, which may not be met with high yield for IP2 above 35-40 dBm without adjustment.

BRIEF DESCRIPTION OF THE DRAWINGS

Embodiments are illustrated by way of example and not by way of limitation in the figures of the accompanying drawings, in which like references indicate similar elements.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present disclosure; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrases "A/B" and "A and/or B" mean (A), (B), or (A and B); and the phrase "A, B, and/or C" means (A), (B), (C), (A and B), (A and C), (B and C) or (A, B and C).

As used herein, reference to an "element" may refer to a hardware, a software, and/or a firmware element employed to obtain a desired outcome. Although only a given number of discrete elements may be illustrated and/or described, such elements may nonetheless be represented by additional elements or fewer elements without departing from the spirit and scope of embodiments of this disclosure.

Figure 1:
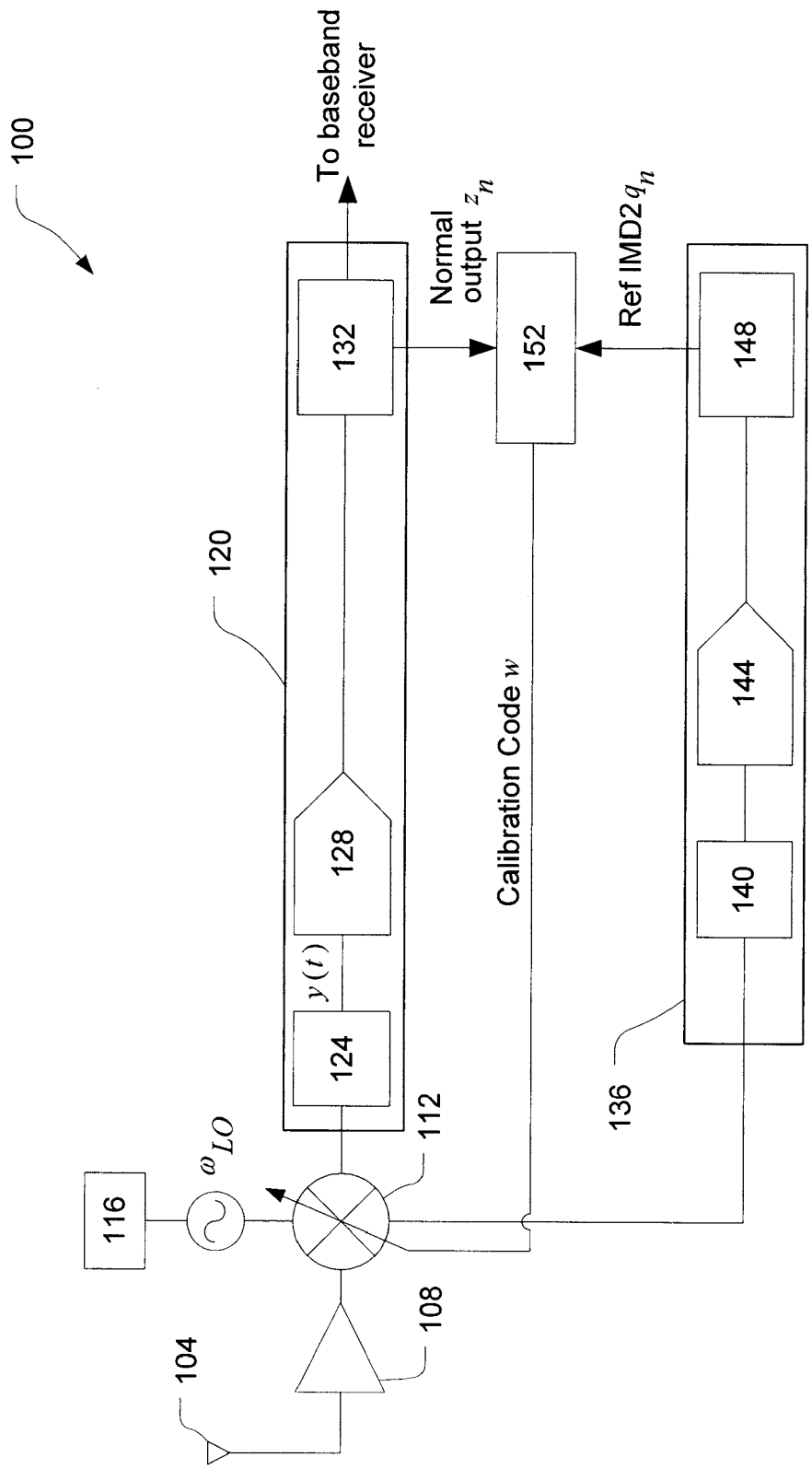
FIG. 1 illustrates a receiver in accordance with various embodiments.

FIG. 1 illustrates a receiver 100 in accordance with various embodiments. The receiver 100 may include an antenna structure 104 having one or more antennas to receive over-the-air RF signals. The received RF signals may be amplified through a low-noise amplifier (LNA) 108 and provided to a mixer 112. The mixer 112 may mix the received RF signal with an LO signal, having a frequency $\omega_{LO}$ of a carrier wave of a wanted signal, from an LO 116, to downconvert the RF signal to a zero IF signal.

The mixer 112 may provide the downconverted signal to a receive chain 120 of the receiver 100. The receive chain 120 may include a baseband amplifier 124 to provide a controlled gain to the downconverted signal, an analog-to-digital converter (ADC) 128 to digitize the signal, and a high pass filter (HPF) 132 to filter out unwanted low-frequency portions of the signal. The HPF 132 may output an output signal $z_n$ expressed by:

$$z_n = g_1 s_n + w k q_n + g_2 q_n + n_n \qquad \text{EQ. 1}$$

where $s_n$ is the wanted signal, $q_n$ is a Ref IMD2 signal, $n_n$ is noise, $g_1$ is receiver gain, $g_2$ includes unintentional IMD2 gain, w is a calibration code, and k is a constant whose sign may be determined with designing the receiver 100.

The IMD2 component, e.g., the $g_2 q_n$, may be the result of second order nonlinearities associated with various circuits in the receiver, e.g., the mixer 112 and/or baseband amplifier 124, that generate spectral components from blocker signals as direct current (DC) components in-band with the RF signal that is processed through the receive chain 120. These DC components may cause a DC offset that distorts the wanted signal. Accordingly, various embodiments provide for the measuring of these IMD2 components and providing the calibration code to control an intentional mismatch (e.g., DC offset voltage) provided to the mixer 112. This will, in turn, improve performance of the receiver 100 in the presence of inter- and intra-platform blocker signals.

The mixer 112 may also provide a reference signal to a reference sensing chain 136 of the receiver 100 that may correspond to the IMD2 component. The reference sensing chain 136 may include a low pass filter (LPF) 140 for filtering out unwanted high-frequency portions of the signal, an ADC 144 to digitize the reference signal, and a HPF 148 to filter out unwanted low-frequency portions of the signal. The HPF 148 may output the Ref IMD2 signal $q_n$.

Various equalization sections may be employed in the reference sensing chain 136 and/or the receive chain 120 if there is a large difference between transfer functions of the respective chains.

The receiver 100 may include a calibrator 152 that may receive the output signal $z_n$ from the receiver chain, the Ref IMD2 signal $q_n$ from the reference sensing chain, and generate the calibration code w, which is fed back to the mixer 112.

When a power of $z_n$ is reduced, the IP2 may be increased. This may be due to $q_n$ being uncorrelated to $s_n$ and $g_1$ being almost independent of w. A least mean square (LMS) algorithm to provide w is:

$$w_{n+1} = w_n - 2\mu k z_n q_n,  \quad \text{Equation 2}$$

where $\mu > 0$ and controls learning speed and algorithm stability. The term $z_n q_n$ may be replaced by its short-term average $(z_n q_n + z_{n+1} q_{n+1} + \ldots + z_{n+L} q_{n+L})/L$ to get a more stable result.

Equation 1 may utilize a hardware multiplier to correlate $z_n$ and $q_n$. This multiplier may be eliminated by using a sign algorithm such as $$w_{n+1} = w_n - 2\mu \text{sign}(k)\text{sign}(q_n) z_n, \quad \text{Equation 3}$$

or $$w_{n+1} = w_n - 2\mu \text{sign}(k)\text{sign}(q_n)\text{sign}(z_n). \quad \text{Equation 4}$$

Then the correlation operation may be implemented by using an XOR gate or multiplexer in the calibrator 152. The correlation result may be substituted by its short-term average.

Figure 2:
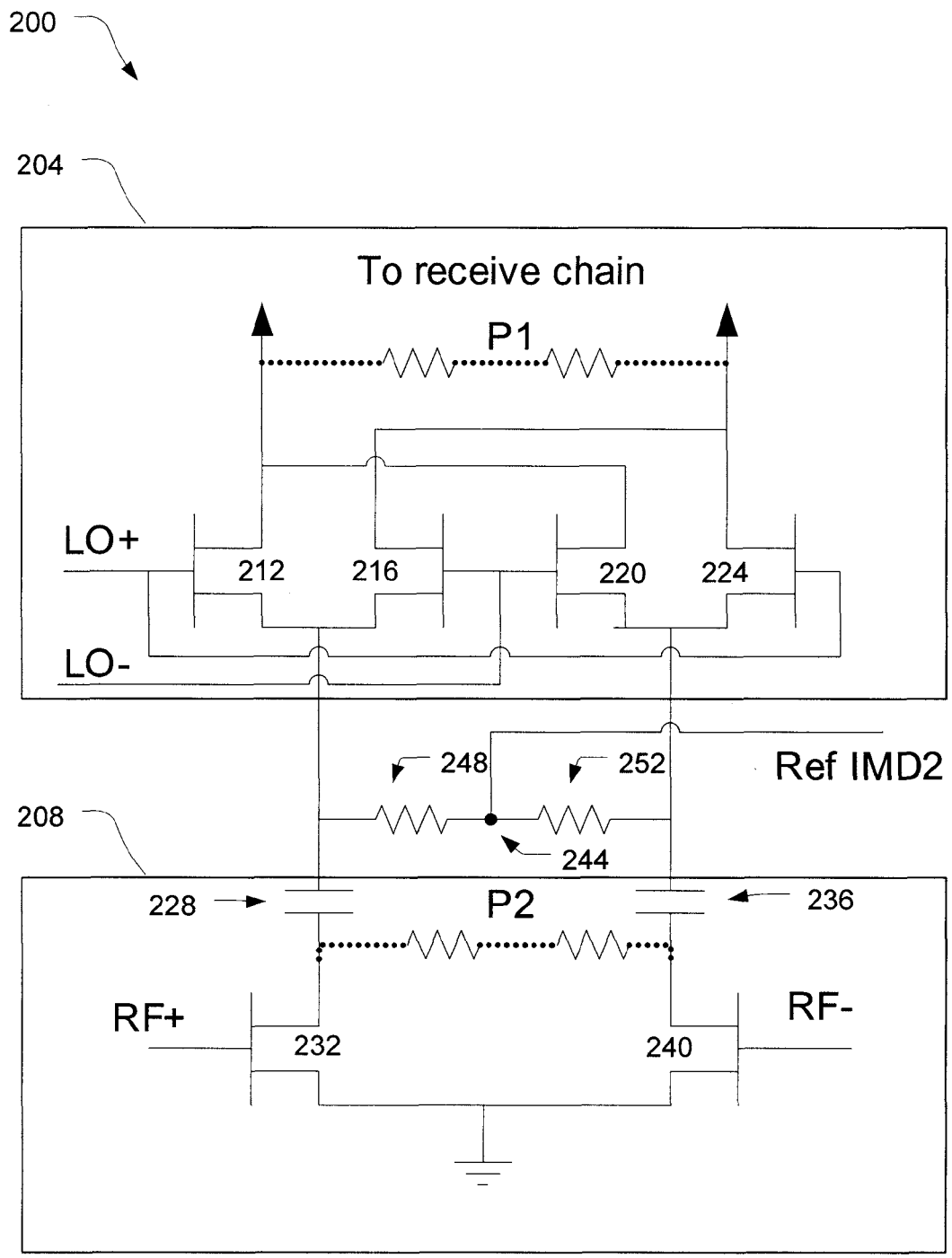
FIG. 2 illustrates a mixer in accordance with various embodiments.

FIG. 2 illustrates a mixer 200 in accordance with various embodiments. The mixer 200 may be similar to and substantially interchangeable with mixer 112 and/or any other mixer described herein.

The mixer 200 may include a core 204 and a transconductor 208. The core 204 may include four transistors, e.g., transistors 212, 216, 220, and 224, coupled to one another as shown. A first differential LO input LO+ may be provided to gates of transistors 212 and 224, while a second differential LO input LO− may be provided to gates of transistors 216 and 220. The sources of the transistors 212, 216, 220, and 224 may be coupled to the transconductor 208, while the drains of the transistors may be coupled to the receive chain, e.g., receive chain 120.

The transconductor 208 may have a first branch having a capacitor 228 and a transistor 232 and a second branch having a capacitor 236 and a transistor 240. The transistors 232 and 240 may be gated by a first differential RF signal RF+ and a second differential RF signal RF− signal, respectively. Sources of the transistors 232 and 240 may be coupled to a ground, while their drains may be coupled to sources of the transistors 212, 216, 220, and 224 through capacitors 244 and 248 as shown.

In some embodiments, the mixer 200 may be a passive mixer with no DC current flow on the core 204. As shown in FIG. 2, this may be achieved by the capacitors 228 and 236 preventing DC current from flowing to the core 204. Used in this context, the capacitors 228 and 236 may also be referred to as DC blocking capacitors. In other embodiments, passivity of the mixer 200 may be provided through other arrangements.

The Ref IMD2 signal may be taken at a node 244 that is between the core 204 and the transconductor 208. The node 244 may be bracketed by resistors 248 and 252 to condition the signal. While the node 244 is shown in FIG. 2 as the point between resistors 248 and 252, it may also refer to the entire segment connecting the branches of the transconductor 208.

In various embodiments, the Ref IMD2 signal may be taken at alternative locations shown as P1 and P2 in FIG. 2. However, the Ref IMD2 signal at the node 244 between the core 204 and the capacitors 228 and 236 of the transconductor 208 may be strongly correlated to the IMD2 component of the output signal $z_n$. Furthermore, the level of Ref IMD2 when taken at the point shown may be high, which may facilitate the design of the circuitry of the reference sensing chain 136.

As is generally shown in FIG. 2, the LO signal and RF signal provided to the mixer 200 and the mixed signal provided to the receive chain 120, may be balanced differential signals, while the Ref IMD may be a single ended signal.

Figure 3:
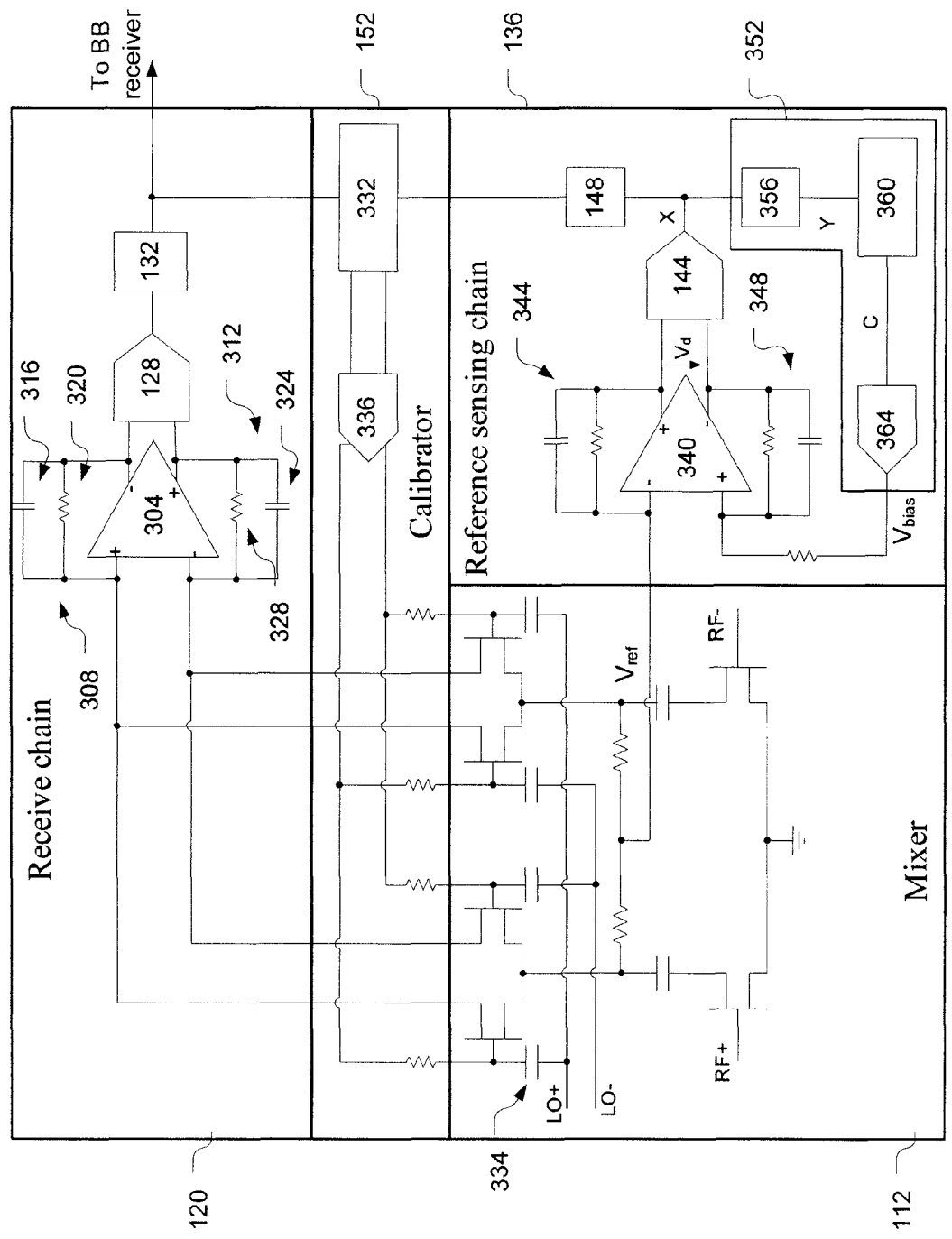
FIG. 3 illustrates a receiver in accordance with various embodiments.

FIG. 3 illustrates the receiver 100 in additional detail in accordance with various embodiments. As shown, the baseband amplifier 124 may include an operational amplifier 304 with a pair of feedback loops 308 and 312. The feedback loop 308 may include a capacitor 316 coupled to a resistor 320 in parallel. Similarly, the feedback loop 312 may include a capacitor 324 coupled to a resistor 328 in parallel. The calibrator 152 may include a calibration engine 332 configured to implement a calibration algorithm, and a digital-to-analog converter (DAC) 336 to convert the digital calibration code w to an analog calibration code w that may be used to provide the DC offset to the mixer 112. In some embodiments, the DC offset may be provided to the mixer 112 by shifting a DC bias on the gates of the transistors of the mixer 112 in a manner that will change the IP2 in the desired direction.

While the DC offset is provided to the mixer 112 in FIGS. 1 and 3, other embodiments may provide for DC offset at additional/alternative locations. For example, the DC offset may be provided at the baseband level through adjustment of the feedback loops 308 and/or 312. For another example, the DC offset may be provided through the LO 116.

The mixer 112 is shown with a circuit topology similar to mixer 200 of FIG. 2. In this embodiment, the mixer 112 also includes a number of capacitors 334 coupled to respective gate terminals of the core transistors. These capacitors 334 act to couple alternating current (AC) of the LO drive to the mixer 112 to establish a peak-to-peak voltage swing independently from the DC bias gate voltage.

The reference sensing chain 136 may have an operational amplifier 340 having feedback loops 344 and 348, similar to baseband amplifier 124. The output of the operational amplifier 340 may be coupled to the ADC 144 and provide a voltage $V_d$. The reference sensing chain 136 may also include a DC cancellation loop 352 to cancel the DC component in $V_d$ so that the ADC 144 will not be saturated. The DC cancellation loop may have a low-pass filter 356, a controller 360, and a DAC 364. The output of the DC cancellation loop 352 may provide a biasing voltage $V_{bias}$ to an input of the operational amplifier 340. Other embodiments may utilize additional/alternative DC cancellation procedures.

The above described embodiments show the receive chain 120 having one branch. In other embodiments, a DCR may include two branches, e.g., an in-phase carrier (I) branch and a quadrature carrier (Q) branch, in order to obtain an orthogonal baseband signal.

Figure 4:
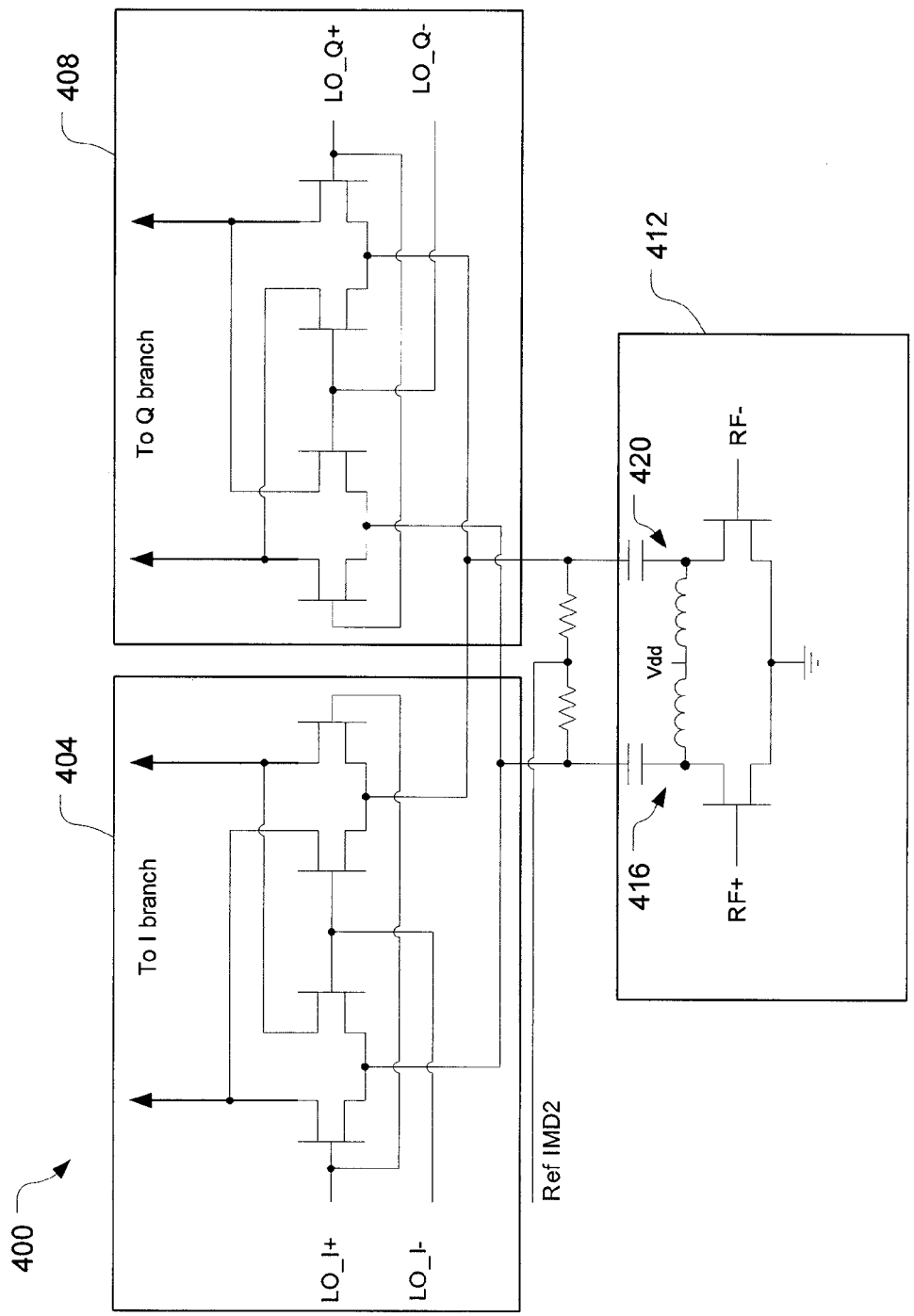
FIG. 4 illustrates a mixer with two cores in accordance with various embodiments.

FIG. 4 illustrates a mixer 400 that may support a receive chain having and I and a Q branch in accordance with various embodiments. Except as otherwise noted, the mixer 400 may be similar to and substantially interchangeable with mixer 112 and/or mixer 200.

The mixer 400 may include an I core 404 and a Q core 408. Each core may have a number of transistors intercoupled as shown. The I core 404 and the Q core 408 may both be coupled to a transconductor 412.

In some embodiments, the transconductor 412 may be coupled with a positive supply voltage $V_{dd}$ applied between inductors 416 and 420. The supply voltage $V_{dd}$ and inductors 416 and 420 may provide a high impedance and biasing current to the transistors of the transconductor 412. Other mixers described herein may also include similar mechanisms for providing appropriate impedances/biasing currents.

Figure 5:
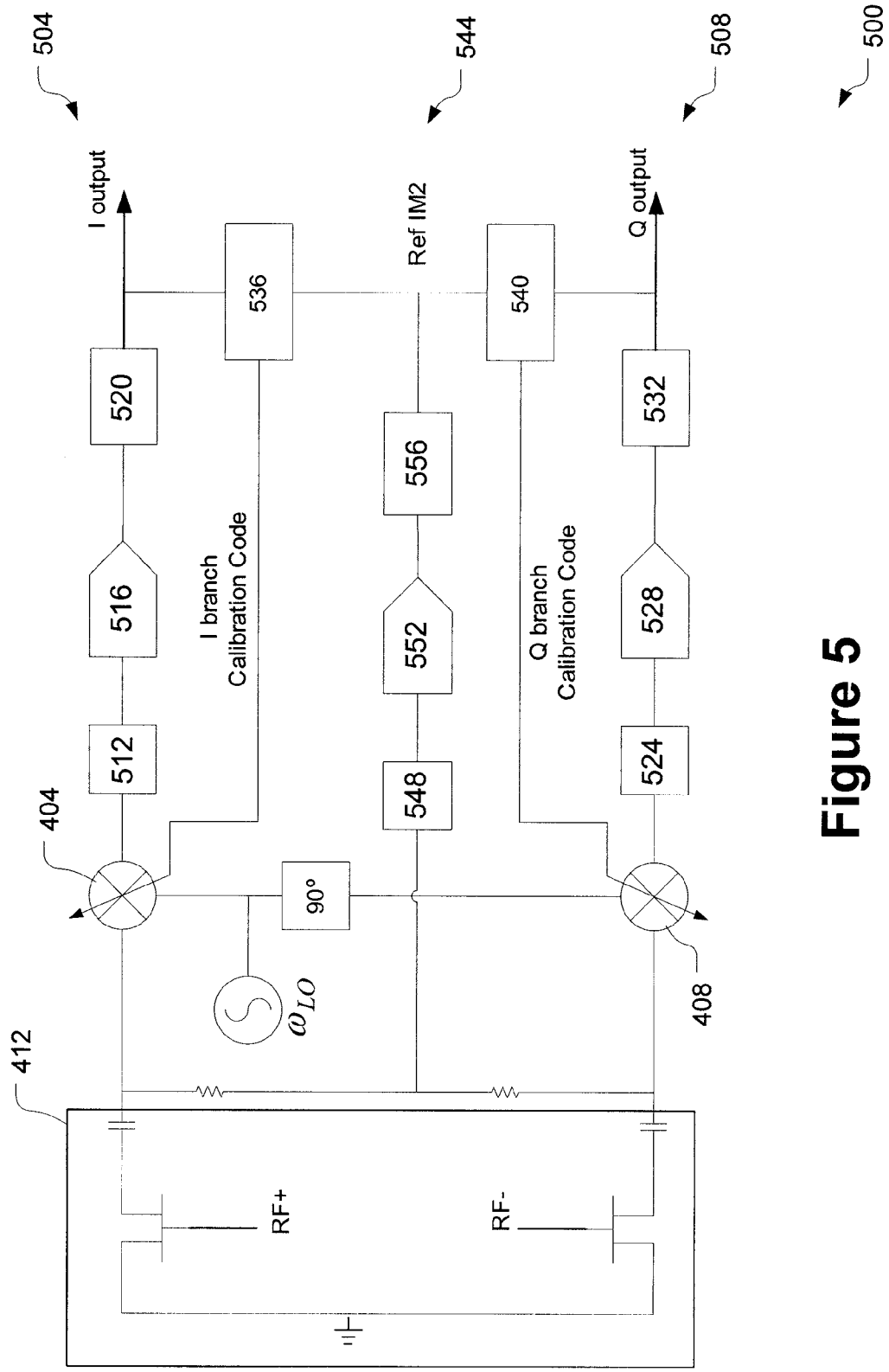
FIG. 5 illustrates a receiver with a two-branch receive chain in accordance with various embodiments.

FIG. 5 illustrates a receiver 500 with a receive chain with two branches in accordance with some embodiments. In particular, the receiver 500 may include an I branch 504 and a Q branch 508.

The I branch 504 may include a baseband amplifier 512, an ADC 516, and an HPF 520 operating similar to like-named elements described above with reference to the receive chain 120. Similarly, the Q branch 508 may include a baseband amplifier 524, an ADC 528, and an HPF 532.

The receiver 500 may include an I branch calibrator 536 to provide an I branch calibration code $w_I$ to the I core 404 of the mixer 400. The receiver 500 may also include a Q branch calibrator 540 to provide a Q branch calibration code $w_Q$ to the Q core 408. While these calibrators are shown as separate elements in FIG. 5, they may be combined in a single element that generates and provides both calibration codes.

The receiver 500 may include a reference sensing chain 544 coupled to the transconductor 412 of the mixer 400. The reference sensing chain 544 may have an LPF 548, an ADC 552, and an HPF 556 that operate similar to like-named components of reference sensing chain 136 described above.

Both the I and the Q branches may be calibrated. In some embodiments, part of the IMD2 current from the I branch may flow into the Q branch and vice versa. This may be due to the passive nature of the mixer 400 and, in particular, to high impedance of the capacitors of the transconductor 412 at the frequency of the IMD2 components. This IMD2 coupling between the I and the Q branches may be represented by the following equations.

$$z_{In} = g_{I1}s_{In} + (k_{II}w_I + k_{IQ}w_Q + g_{I_2})q_n + n_{In} \qquad \text{Equation 5}$$

$$z_{Qn} = g_{Q1}s_{Qn} + (k_{QI}w_I + k_{QQ}w_Q + g_{Q_2})q_n + n_{Qn} \qquad \text{Equation 6}$$

where $k_{II}$ is a constant providing the slope of the calibration constant for the I chain that is provided by influence of the I branch, $k_{IQ}$ is a constant providing the slope of the calibration constant for the I chain that is provided by influence of the Q branch, $k_{QI}$ is a constant providing the slope o the calibration constant for the Q chain that is provided by influence of the I branch, and $k_{QQ}$ is a constant providing the slope o the calibration constant for the Q chain that is provided by influence of the Q branch.

A calibration operation of the I branch 504 and the Q branch 508 may reduce, to an acceptably low value (e.g., an absolute minimum, a relative minimum, etc.), a power of $z_{In}$ and $z_{Qn}$, simultaneously, or their total power.

Figure 6:
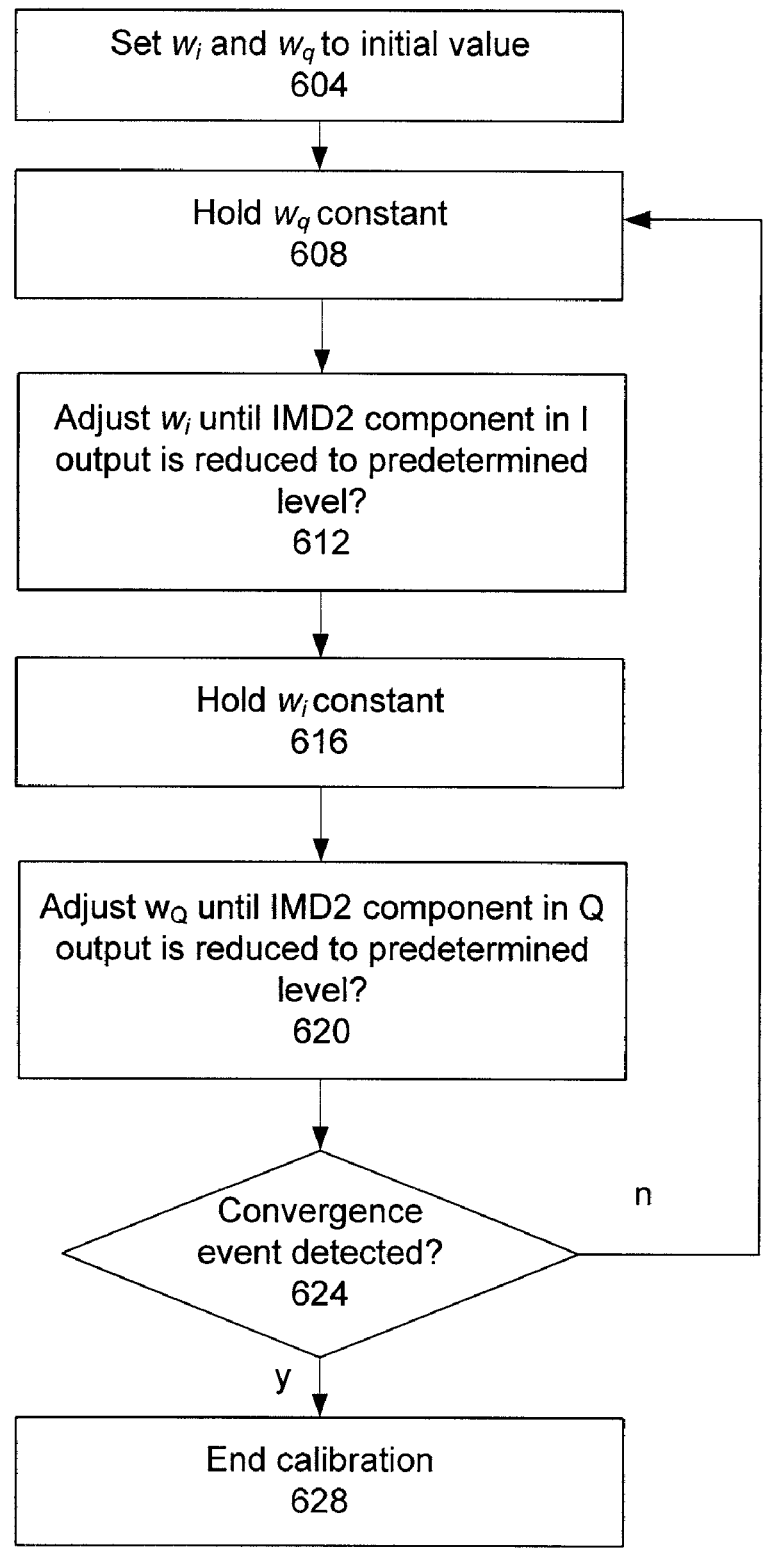
FIG. 6 is a flowchart depicting a calibration operation in accordance with various embodiments.

FIG. 6 illustrates calibration operations of the calibrators 536 and/or 540 in accordance with some embodiments. At block 604, the calibrators may set $w_i$ and $w_q$ to initial values. At block 608, the calibrator 540 may hold $w_q$ constant while calibrator 536 adjusts $w_i$ until an IMD2 component associated with the I branch 504 is reduced to an acceptable level at block 612. This calibration may be done in accordance with Equations 7, 8, or 9 as follows:

$$w_{I,m,n+1} = w_{I,m,n} - 2\mu k_{II} z_{In} q_n \qquad \text{Equation 7}$$

$$w_{I,m,n+1} = w_{I,m,n} - 2\mu \text{sign}(k_{II}) \text{sign}(q_n) z_{In} \qquad \text{Equation 8}$$

$$w_{I,m,n+1} = w_{I,m,n} - 2\mu \text{sign}(k_{II}) \text{sign}(z_{In}) \text{sign}(q_n) \qquad \text{Equation 9}$$

The final $w_I$ of a particular calibration iteration is $w_{I,m}$.

At block 616, the calibrator 536 may hold $w_I$ constant while the calibrator 540 adjusts $w_Q$ until an IMD2 component associated with the Q branch 508 is reduced to an acceptable level at block 620.

At block 624, it may be determined whether a convergence event is detected. In some embodiments, a convergence event may be that the IMD2 components of the two branches converge to an acceptably low level. In other embodiments, the convergence event may be a completion of a predetermined number of one or more calibration iterations (a calibration iteration being the operations represented by blocks 608 to 620) or some other event associated with an acceptable convergence.

If a convergence event is not detected at block 624, the process may loop back to block 608 for another calibration iteration. If a convergence event is detected at block 624 the calibration process may end at block 628. When the calibration process ends, the calibration codes may be fixed and the reference sensing chain 544 may be powered down for an extended period of time.

It has been shown that the calibration operation described in FIG. 6 converges given that $|k_{II}| > |k_{IQ}|$ and $|k_{QQ}| > |k_{QI}|$.

Figure 7:
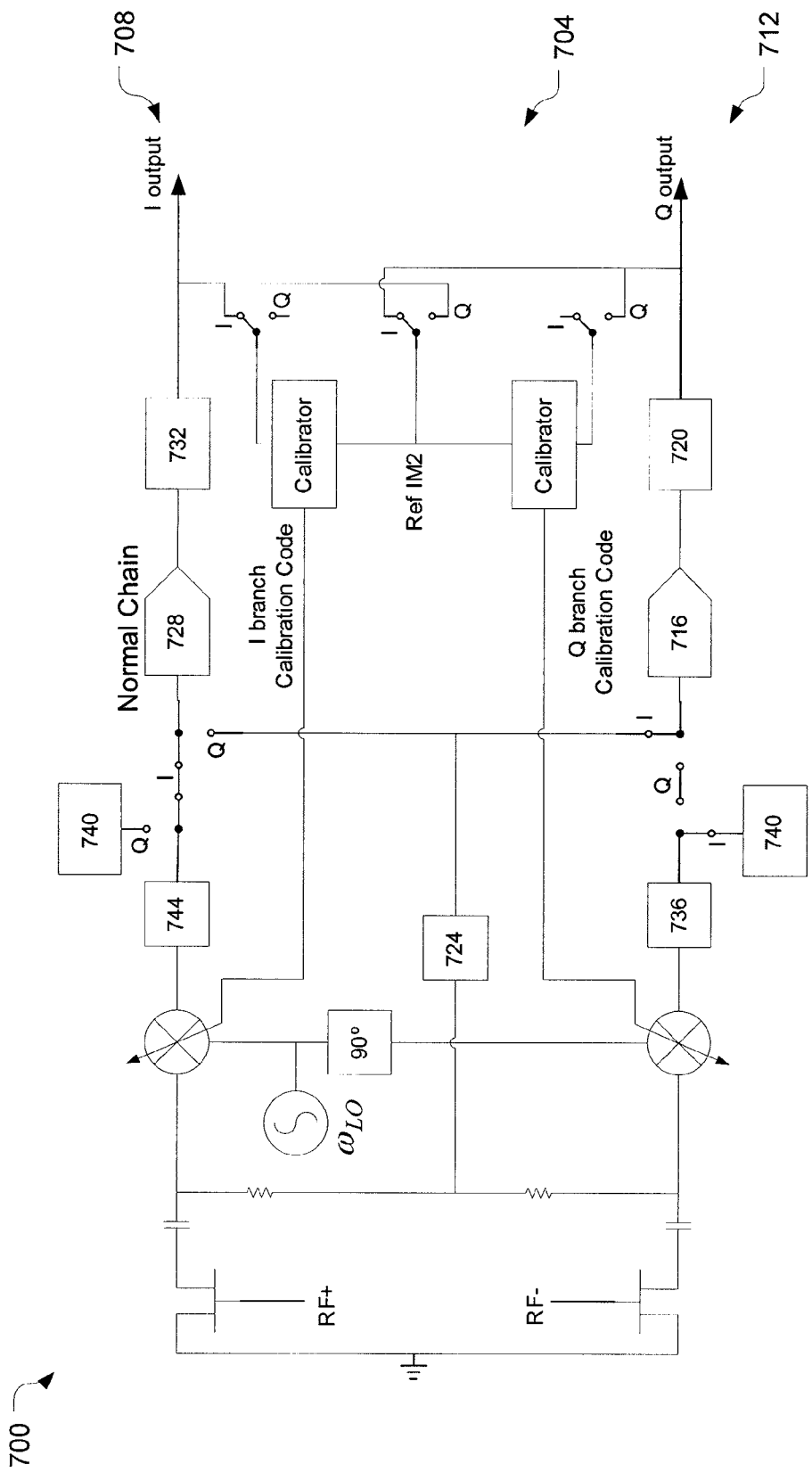
FIG. 7 illustrates a receiver in accordance with various embodiments.

FIG. 7 illustrates a receiver 700 in accordance with another embodiment. In this embodiment, a reference sensing chain 704 utilizes elements of first branch of the receiver 700 when calibrating a second branch of the receiver and vice versa.

When calibrating an I branch 708, all of the switches shown may be positioned in the I setting as shown in FIG. 7. During this calibration, elements of the Q branch 712, e.g., an ADC 716 and an HPF 720 may be used for a reference sensing chain with LPF 724.

When calibrating the Q branch 712, all of the switches may be positioned in the Q setting and the reference sensing chain may incorporate elements of the I branch, e.g., ADC 728 and 732.

When the I branch 708 is being calibrated, a baseband amplifier 736 of the Q branch 712 may be coupled to a dummy load 740. Conversely, when the Q branch 712 is being calibrated, a baseband amplifier 744 of the I branch 708 may be coupled to the dummy load 740.

Other than these switching aspects, the calibration of the receiver 700 may be similar to the calibration of the receiver 500 with its dedicated receiver sensing chain 544.

Figure 8:
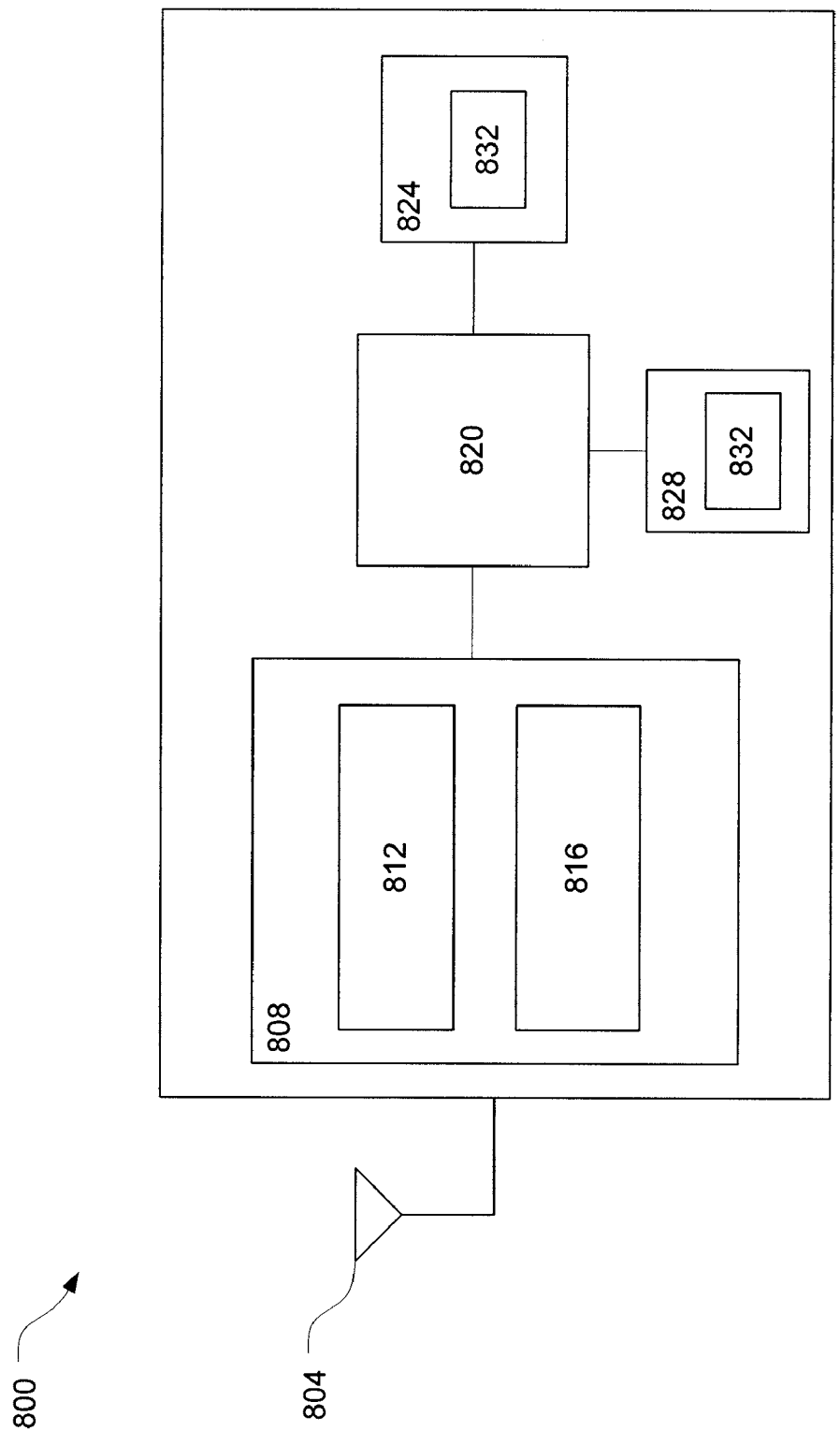
FIG. 8 illustrates a platform in accordance with various embodiments.

FIG. 8 illustrates a platform 800 capable of employing calibration techniques in accordance with various embodiments. The platform 800 may include an antenna structure 804 and an RF front end 808 having a plurality of radios, e.g., radio 812 and radio 816.

The antenna structure 804 may include one or more directional antennas, which radiate or receive primarily in one direction (e.g., for 120 degrees), cooperatively coupled to one another to provide substantially omnidirectional coverage. In other embodiments, the antenna structure 804 may include one or more omnidirectional antennas that radiate or receive equally well in all directions.

Each of the radios 812 and 816 may have a transceiver, including a receiver similar to any of the receivers discussed herein, configured to communicate via the antenna structure 804 in a different band and/or with different communication protocols/standards. The communication protocols/standards may be selected from any of the Institute of Electrical and Electronics Engineers (IEEE) wireless standards (e.g., 802.11, 802.16, etc.), mobile digital television (MDTV), ultra-wide band (UWB), wideband-CDMA (WCDMA), Bluetooth, etc. In some embodiments, radios 812 and 816 may operate simultaneously with one another and cause intra-platform interference that may result in the IMD2 as discussed above.

The platform may also have a processor 820, storage 824, and memory 828 coupled to each other as shown. In some embodiments, one or more of these elements may be coupled to each other through one or more buses (not shown).

Memory 828 and storage 824 may include in particular, temporal and persistent copies of calibration logic 832, respectively. The calibration logic 832 may include instructions that when executed by the processor 820 result in the platform 800 and, in particular, the radio 812 and/or radio 816 performing calibration operations described herein.

In various embodiments, the processor 820 may include one or more single-core processors, multiple-core processors, controllers, application-specific integrated circuits (ASICs), etc.

In various embodiments, the memory 828 may include RAM, dynamic RAM (DRAM), static RAM (SRAM), synchronous DRAM (SDRAM), dual-data rate RAM (DDRRAM), etc.

In various embodiments, storage 824 may include integrated and/or peripheral storage devices, such as, but not limited to, disks and associated drives (e.g., magnetic, optical), universal serial bus (USB) storage devices and associated ports, flash memory, read-only memory (ROM), non-volatile semiconductor devices, etc.

In various embodiments, storage 824 may be a storage resource physically part of the platform 800 or it may be accessible by, but not necessarily a part of, the platform 800. For example, the storage 824 may be accessed over a network.

In various embodiments, the platform 800 may have more or less elements, and/or different architectures. In various embodiments, the platform 800 may be any type of wireless communication device including mobile network client devices such as, but not limited to, a personal computing device, a laptop computing device, a phone, etc., or network infrastructure devices, e.g., a base station, an access point, etc.

Although the present disclosure has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present disclosure. Those with skill in the art will readily appreciate that the present disclosure may be implemented in a very wide variety of embodiments. This description is intended to be regarded as illustrative instead of restrictive on embodiments of the present disclosure.

What is claimed is:

1. A method comprising:
   adjusting a calibration code of a quadrature carrier (Q) branch of a receive chain to reduce a second-order intermodulation distortion (IMD2) component associated with the Q branch;
   holding a calibration code of an in-phase carrier (I) branch of the receive chain constant during said adjusting of the calibration code of the Q branch;
   adjusting the calibration code of the I branch to reduce an IMD2 component associated with the I branch;
   holding the calibration code of the Q branch constant during said adjusting of the calibration code of the I branch;
   generating, by a reference sensing chain coupled to a passive mixer that is coupled to the Q branch and the I branch, a first reference IMD2 signal corresponding to the I branch; and
   generating, by the reference sensing chain, a second reference IMD2 signal corresponding to the Q branch.

2. The method of claim 1, wherein said adjusting the calibration code of the Q branch and said adjusting the calibration code of the I branch is one calibration iteration and the method further comprises:
   performing one or more additional calibration iterations until a convergence event is detected.

3. The method of claim 1, wherein the passive mixer includes an I core, a Q core, and a transconductor coupled to the I core and the Q core at a node and said reference sensing chain is coupled to the passive mixer at the node.

4. The method of claim 3, wherein said adjusting the calibration code of the Q branch comprises adjusting the Q core of the passive mixer and said adjusting the calibration code of the I branch comprises adjusting the I core of the passive mixer.

5. A method comprising:
   adjusting a calibration code of a quadrature carrier (Q) branch of a receive chain to reduce a second-order intermodulation distortion (IMD2) component associated with the Q branch;
   holding a calibration code of an in-phase carrier (I) branch of the receive chain constant during said adjusting of the calibration code of the Q branch;
   adjusting the calibration code of the I branch to reduce an IMD2 component associated with the I branch; and
   holding the calibration code of the Q branch constant during said adjusting of the calibration code of the I branch:
   wherein said adjusting the calibration code of the Q branch comprises adjusting one or more feedback loops of a baseband amplifier of the Q branch and said adjusting the calibration code of the I branch comprises adjusting one or more feedback loops of a baseband amplifier of the I branch.

6. An apparatus comprising:
   a mixer having one or more cores coupled to a transconductor at a node, the mixer configured to downconvert a radio frequency (RF) signal by mixing the RF signal with a local oscillator (LO) signal;
   a receive chain coupled to the mixer and configured to receive the downconverted signal and to generate a digitized baseband signal;
   a reference sensing chain coupled to the mixer at the node and configured to receive a reference signal that corresponds to a second-order intermodulation distortion (IMD2) component of the downconverted signal; and
   a calibrator coupled to the reference sensing chain and the receive chain and configured to calibrate the apparatus.

7. The apparatus of claim 6, wherein the receive chain includes an in-phase carrier (I) branch and a quadrature carrier (Q) branch and the one or more cores includes an I core and a Q core, respectively coupled to the I branch and the Q branch of the receive chain.

8. The apparatus of claim 7, wherein the transconductor comprises:
a first transistor having a gate to a receive a first differential RF signal input;
a second transistor having a gate to receive a second differential RF signal input;
a first capacitor coupled to a drain of the first transistor and to the I core and the Q core; and
a second capacitor coupled to a drain of the second transistor and to the I core and the Q core.

9. The apparatus of claim 8, wherein the node is between the first capacitor and the one or more cores and is also between the second capacitor and the one or more cores.

10. The apparatus of claim 7, wherein the I branch includes an analog-to-digital converter (ADC), the Q branch includes an ADC converter, and the reference sensing chain is configured to utilize the ADC of the I branch when the calibrator is calibrating the Q branch and to utilize the ADC of the Q branch when the calibrator is calibrating the I branch.

11. The apparatus of claim 7, wherein the calibrator is further configured to
adjust a calibration code of the Q branch to reduce an IMD2 component associated with the Q branch;
hold a calibration code of the I branch constant during said adjusting of the calibration code of the Q branch;
adjust the calibration code of the I branch to reduce an IMD2 component associated with the I branch; and
hold the calibration code of the Q branch constant during said adjusting of the calibration code of the I branch.

12. The apparatus of claim 11, wherein said adjustment of the calibration code of the Q branch and said adjustment of the calibration code of the I branch is one calibration iteration and the calibrator is further configure to:
perform one or more additional calibration iterations until a convergence event is detected.

13. The apparatus of claim 7, wherein the mixer is a passive mixer.

14. The apparatus of claim 11, wherein the one or more cores of the mixer comprise a plurality of transistors each having a gate, and the calibrator is further configured to provide a direct current (DC) offset to the mixer by shifting a DC bias on the gates of the plurality of transistors based at least in part on the calibration code.

15. A system comprising:
a receive chain with a quadrature carrier (Q) branch and an in-phase carrier (I) branch;
a mixer having an I core and a Q core coupled to a transconductor at a node, the I core further coupled to the I branch and the Q core further coupled to the Q branch, the mixer configured to downconvert a radio frequency (RF) signal by mixing the RF signal with a local oscillator (LO) signal;
a reference sensing chain coupled to the mixer at the node and configured to receive a reference signal that corresponds to the IMD2 component associated with the I branch and the Q branch; and
a calibrator coupled to the receive chain and configured to adjust a calibration code of the Q branch to reduce a second-order intermodulation distortion (IMD2) component associated with the Q branch;
hold a calibration code of the I branch constant during said adjustment of the calibration code of the Q branch;
adjust the calibration code of the I branch to reduce an IMD2 component associated with the I branch; and
hold the calibration code of the Q branch constant during said adjustment of the calibration code of the I branch.

16. The system of claim 15, wherein the transconductor comprises:
a first transistor having a gate to receive a first differential RF signal input;
a second transistor having a gate to receive a second differential RF signal input;
a first capacitor coupled to a drain of the first transistor and to the I core and the Q core; and
a second capacitor coupled to a drain of the second transistor and to the I core and the Q core.

17. The system of claim 16, wherein the node is between the first capacitor and the one or more cores and is also between the second capacitor and the one or more cores.

18. The system of claim 15, wherein the I branch includes an analog-to-digital converter (ADC), the Q branch includes an ADC, and the reference sensing chain is configured to utilize the ADC of the I branch when the calibrator is calibrating the Q branch and to utilize the ADC of the Q branch when the calibrator is calibrating the I branch.

* * * * *